(12) United States Patent
Ishida et al.

(10) Patent No.: US 9,397,360 B2
(45) Date of Patent: Jul. 19, 2016

(54) DRIVE UNIT, LENS MODULE, IMAGE PICKUP UNIT, FUEL CELL, AND ION EXCHANGE RESIN

(75) Inventors: Takehisa Ishida, Tokyo (JP); Nobuyuki Nagai, Kanagawa (JP); Yusaku Kato, Tokyo (JP)

(73) Assignee: Dexerials Corporation, Tokyo (JP)

( * ) Notice: Subject to any disclaimer, the term of this patent is extended or adjusted under 35 U.S.C. 154(b) by 533 days.

(21) Appl. No.: 13/443,522

(22) Filed: Apr. 10, 2012

(65) Prior Publication Data

US 2012/0276462 A1    Nov. 1, 2012

(30) Foreign Application Priority Data

Apr. 28, 2011    (JP) ................. 2011-101411

(51) Int. Cl.
  *G02B 7/08*    (2006.01)
  *H01M 8/10*    (2016.01)
(52) U.S. Cl.
  CPC ............... *H01M 8/1051* (2013.01); *G02B 7/08* (2013.01); *Y02E 60/521* (2013.01)
(58) Field of Classification Search
  CPC ........... B06B 1/00–1/085; H04R 17/00–17/08; H01L 41/02–41/297
  USPC .................... 359/696; 310/300, 800
  See application file for complete search history.

(56) References Cited

U.S. PATENT DOCUMENTS

| | | | | |
|---|---|---|---|---|
| 6,569,910 B1 * | 5/2003 | Spindler | ............ | B01J 39/20 521/30 |
| 7,872,396 B2 * | 1/2011 | Chiang | ............ | F03G 7/005 310/311 |
| 8,123,983 B2 * | 2/2012 | Komatsu | ............ | H01B 1/122 252/500 |
| 2007/0285558 A1* | 12/2007 | Oohara | ............ | G02B 7/08 348/345 |
| 2009/0091829 A1* | 4/2009 | Nagai et al. | ............ | 359/557 |
| 2010/0039001 A1* | 2/2010 | Kudoh | ............ | F03G 7/005 310/366 |
| 2010/0141085 A1* | 6/2010 | Wu | ............ | C08J 5/2256 310/311 |
| 2011/0049404 A1* | 3/2011 | Suda | ............ | 251/129.01 |
| 2011/0311899 A1* | 12/2011 | Onodera | ............ | C08G 61/12 429/482 |
| 2012/0133243 A1* | 5/2012 | Okuzaki | ............ | F03G 7/005 310/300 |
| 2013/0181572 A1* | 7/2013 | Hino | ............ | F03G 7/005 310/311 |

FOREIGN PATENT DOCUMENTS

| | | |
|---|---|---|
| CN | 101646966 A | 2/2010 |
| JP | 06-111827 | 4/1994 |
| JP | 2005-229696 | 8/2005 |
| JP | 2006-172635 | 6/2006 |
| JP | 2006-293006 | 10/2006 |
| JP | 2010-072174 | 4/2010 |
| JP | 2010-283927 | 12/2010 |
| JP | 2011-001391 | 1/2011 |

OTHER PUBLICATIONS

Reasons for refusal notice issued in connection with Japanese Patent Application No. 2011-101411, dated Dec. 3, 2014. (5 pages).
May 26, 2015 Office Action issued in Chinese Patent Application No. 2012101189295.

* cited by examiner

*Primary Examiner* — Bumsuk Won
*Assistant Examiner* — Jeffrey Madonna
(74) *Attorney, Agent, or Firm* — K&L Gates LLP

(57) ABSTRACT

There are provided a drive unit, a lens module, an image pickup unit, a fuel cell, and an ion exchange resin, in which a characteristic deterioration depending on an ambient environment may be suppressed. The drive unit includes one or more polymer actuator devices. The polymer actuator device is configured using an ion exchange resin containing a moisturizing agent.

14 Claims, 14 Drawing Sheets

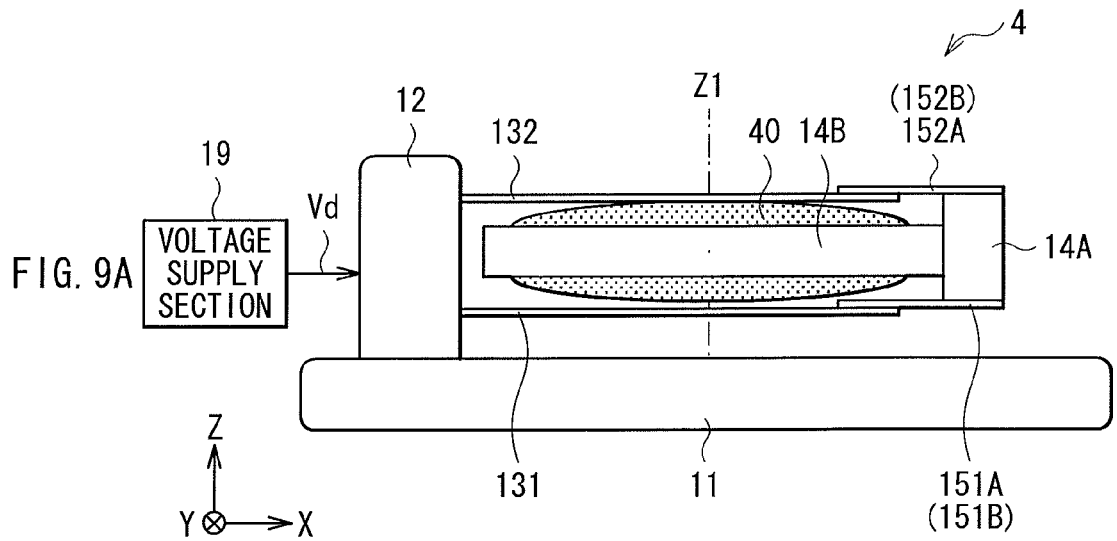
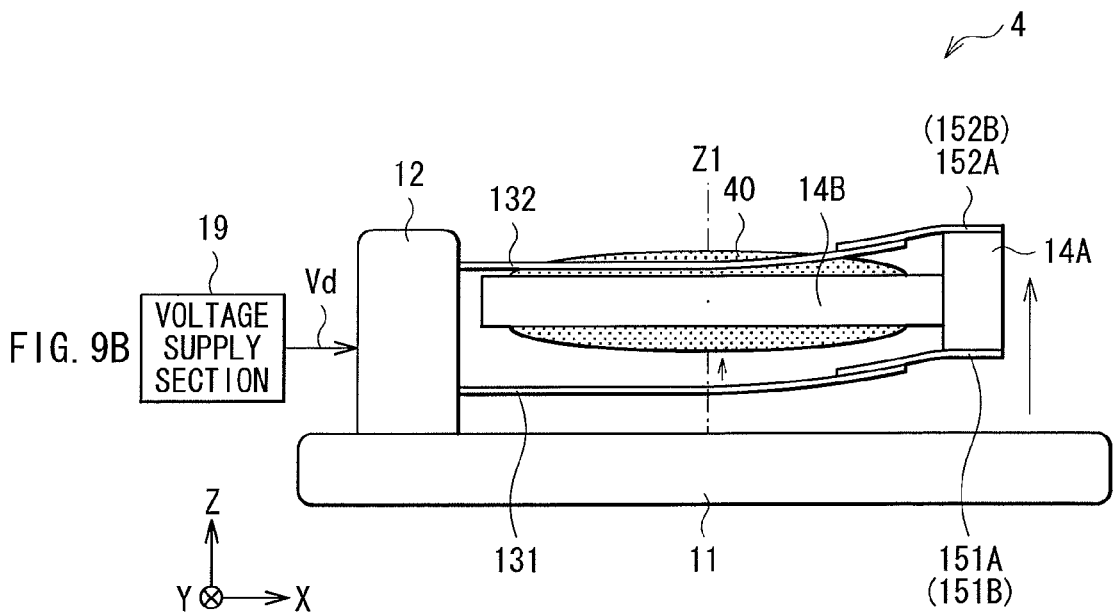

EXAMPLE 1

| MOISTURIZING AGENT | MATERIAL NAME | ADDED AMOUNT (WT%) | AVERAGE RESPONSE SPEED (%) |
|---|---|---|---|
| NONE (COMPARATIVE EXAMPLE) | – | 0 | 100 |
| WATER MOLECULE ADSORBENT (MAINLY CHEMISORPTION) | SORBITOL | 5 | 126 |
| | CALCIUM CHLORIDE | 5 | 110 |
| WATER MOLECULE ADSORBENT (MAINLY PHYSISORPTION) | WATER ABSORPTIVE POLYMER | 10 | 107 |
| | ZEOLITE | 0.5 | 160 |
| | SILICA | 5 | 115 |

EXAMPLE 2
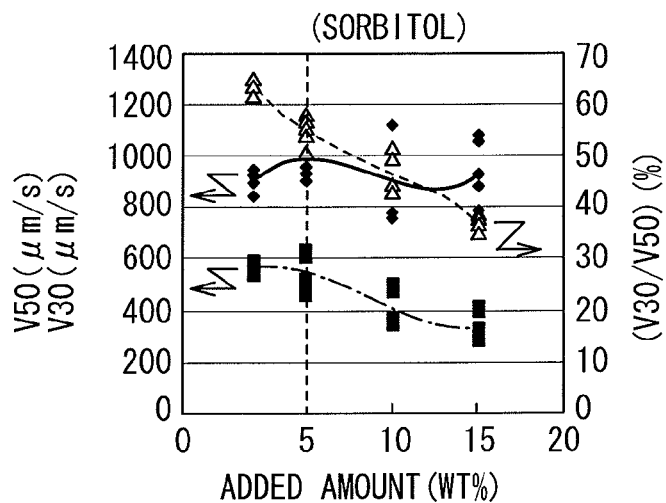
FIG. 11A (SORBITOL)
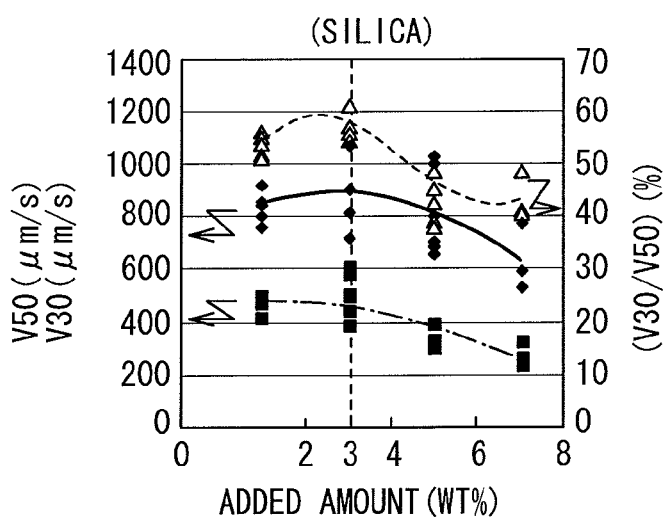
FIG. 11B (SILICA)
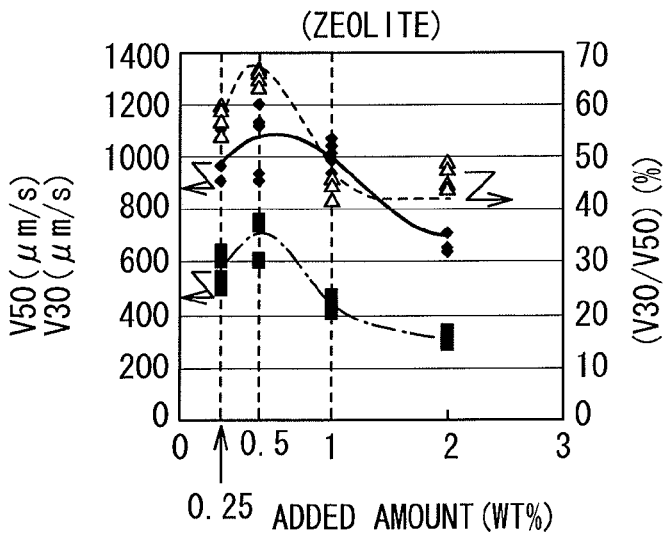
FIG. 11C (ZEOLITE)

EXAMPLE 3

| SAMPLE NO. | EW VALUE (g/eq) | AMOUNT ADDED TO ELECTRODE FILM (WT%) | AMOUNT ADDED TO POLYMER COMPOUND FILM (WT%) | NUMBER OF DAYS LAPSED UNTIL DISPLACEMENT MAGNITUDE DECREASES BY 20% (days) |
|---|---|---|---|---|
| 1 (COMPARATIVE EXAMPLE) | 1050 | 0 | 0 | 1 |
| 2 | 1050 | 0.5 | 0 | 8 |
| 4 | 780 | 0.5 | 0 | 10 |
| 5 | 780 | 0.5 | 0.5 | 28 |

DRIVE UNIT, LENS MODULE, IMAGE PICKUP UNIT, FUEL CELL, AND ION EXCHANGE RESIN

CROSS REFERENCES TO RELATED APPLICATIONS

The present application claims priority to Japanese Priority Patent Application JP 2011-101411 filed in the Japan Patent Office on Apr. 28, 2011, the entire content of which is hereby incorporated by reference.

BACKGROUND

The present disclosure relates to a drive unit using a polymer actuator device, a lens module as well as an image pickup unit including such a drive unit, an ion exchange resin suitable for such a polymer actuator device and the like, and a fuel cell using the ion exchange resin.

In recent years, for example, portable electronic equipment such as a portable telephone, a personal computer (PC), or a PDA (Personal Digital Assistant) has become remarkably multifunctional, and the portable electronic equipment with a lens module thereby having an image pickup function has become common. In such portable electronic equipment, focusing and zooming are performed by moving a lens in the lens module in an optical axis direction.

In general, a way of moving the lens in the lens module by using a voice coil motor or a stepping motor as a drive section is common. Meanwhile, recently, a unit employing a predetermined actuator device as a drive section has been developed from the viewpoint of miniaturization. As such an actuator device, there is, for example, a polymer actuator device (see, for example, Japanese Unexamined Patent Application Publications No. 2006-293006 and No. 2006-172635). The polymer actuator device is a device in which, for example, an ion exchange resin film is interposed between a pair of electrodes. In this polymer actuator device, the ion exchange resin film is displaced in a direction orthogonal to a film surface, due to occurrence of a potential difference between the pair of electrodes.

SUMMARY

Incidentally, in such a polymer actuator device, its characteristics might deteriorate depending on an ambient environment and thus, suggestion of a technique allowing suppression of such a characteristic deterioration is expected. It is to be noted that such a disadvantage of the characteristic deterioration depending on the ambient environment is not limited to the polymer actuator device, and may similarly occur in other devices etc. employing an ion exchange resin.

It is desirable to provide, a drive unit, a lens module, an image pickup unit, a fuel cell, and an ion exchange resin, in which a characteristic deterioration depending on an ambient environment may be suppressed.

According to an embodiment of the present disclosure, there is provided a drive unit including one or more polymer actuator devices, and this polymer actuator device is configured using an ion exchange resin containing a moisturizing agent.

According to another embodiment of the present disclosure, there is provided a lens module including: a lens; and a drive unit driving the lens. The drive unit includes one or more polymer actuator devices, and the polymer actuator device is configured using an ion exchange resin containing a moisturizing agent.

According to another embodiment of the present disclosure, there is provided an image pickup unit including a lens; an image pickup device acquiring an image pickup signal of image formation by the lens; and a drive unit driving the lens. The drive unit includes one or more polymer actuator devices, and the polymer actuator device is configured using an ion exchange resin containing a moisturizing agent.

According to another embodiment of the present disclosure, there is provided a fuel cell including one or more power generation sections. The power generation section includes an oxygen electrode, a fuel electrode, and an electrolyte film inserted between the oxygen electrode and the fuel electrode, and the electrolyte film is configured using an ion exchange resin containing a moisturizing agent.

According to another embodiment of the present disclosure, there is provided an ion exchange resin containing a moisturizing agent.

In the drive unit, the lens module, the image pickup unit, the fuel cell, and the ion exchange resin according to the above-described embodiments of the present disclosure, the moisturizing agent is contained in the ion exchange resin and thereby, a decline in ionic conductivity in the ion exchange resin is suppressed even in an environment at a low humidity, a high temperature, or the like.

According to the drive unit, the lens module, the image pickup unit, the fuel cell, and the ion exchange resin in the above-described embodiments of the present disclosure, the moisturizing agent is contained in the ion exchange resin and thus, it is possible to suppress a decline in ionic conductivity in the ion exchange resin in an environment at a low humidity, a high temperature, or the like. Therefore, a characteristic deterioration depending on an ambient environment (for example, a reduction in response speed in a low humidity environment, a reduction in displacement magnitude after storage in a high temperature environment, and the like) may be suppressed.

It is to be understood that both the foregoing general description and the following detailed description are exemplary, and are provided to provide further explanation of the technology as claimed.

Additional features and advantages are described herein, and will be apparent from the following Detailed Description and the figures.

BRIEF DESCRIPTION OF THE FIGURES

The accompanying drawings are included to provide a further understanding of the disclosure, and are incorporated in and constitute a part of this specification. The drawings illustrate embodiments and, together with the specification, serve to explain the principles of the technology.

FIGS. 9A and 9B are cross-sectional schematic diagrams illustrating operation of the lens module depicted in FIG. 3.

FIGS. 11A to 11C are diagrams illustrating experimental results according to Example 2.

Figure 14:
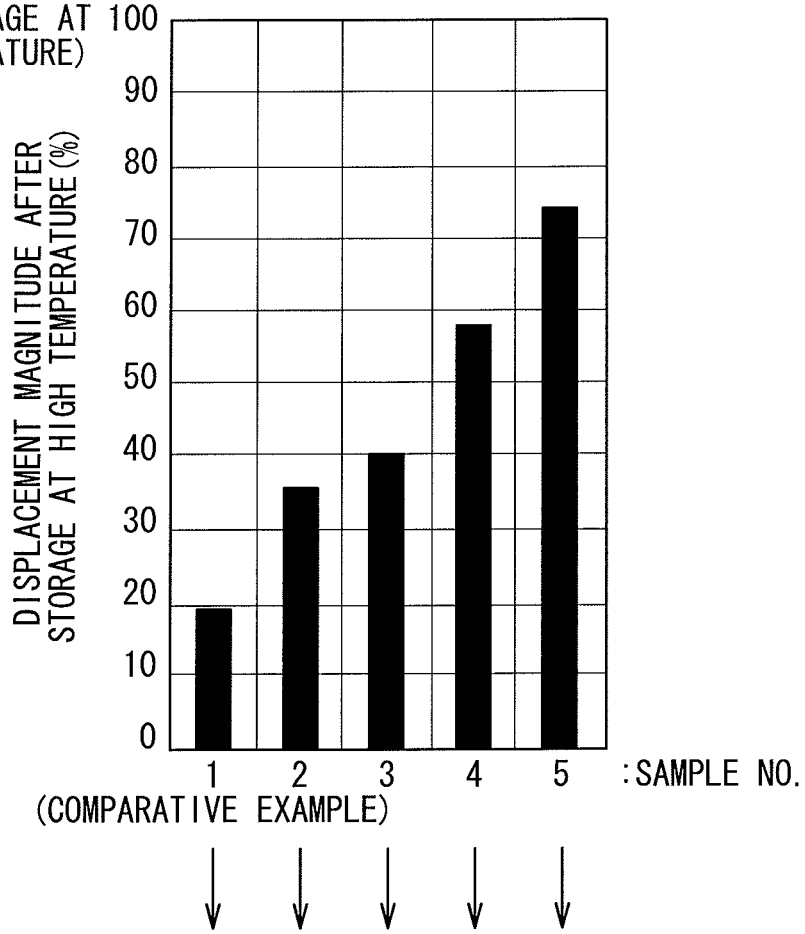

Parts (A) and (B) of FIG. 14 are diagrams illustrating experimental results according to Example 4 and the comparative example.

Figure 15:
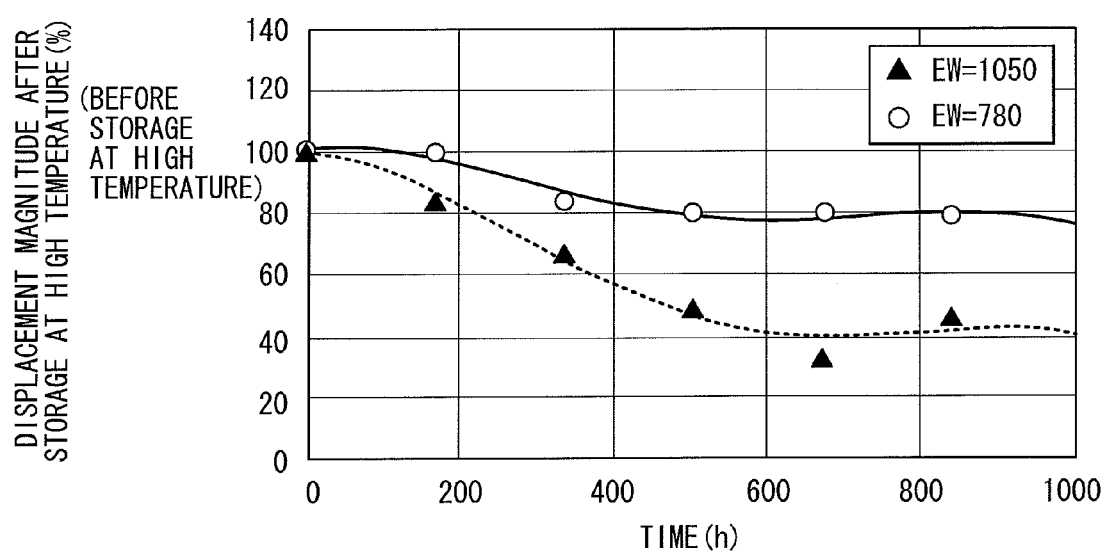

FIG. 15 is a diagram illustrating other experimental results according to Example 4.

Figure 16:
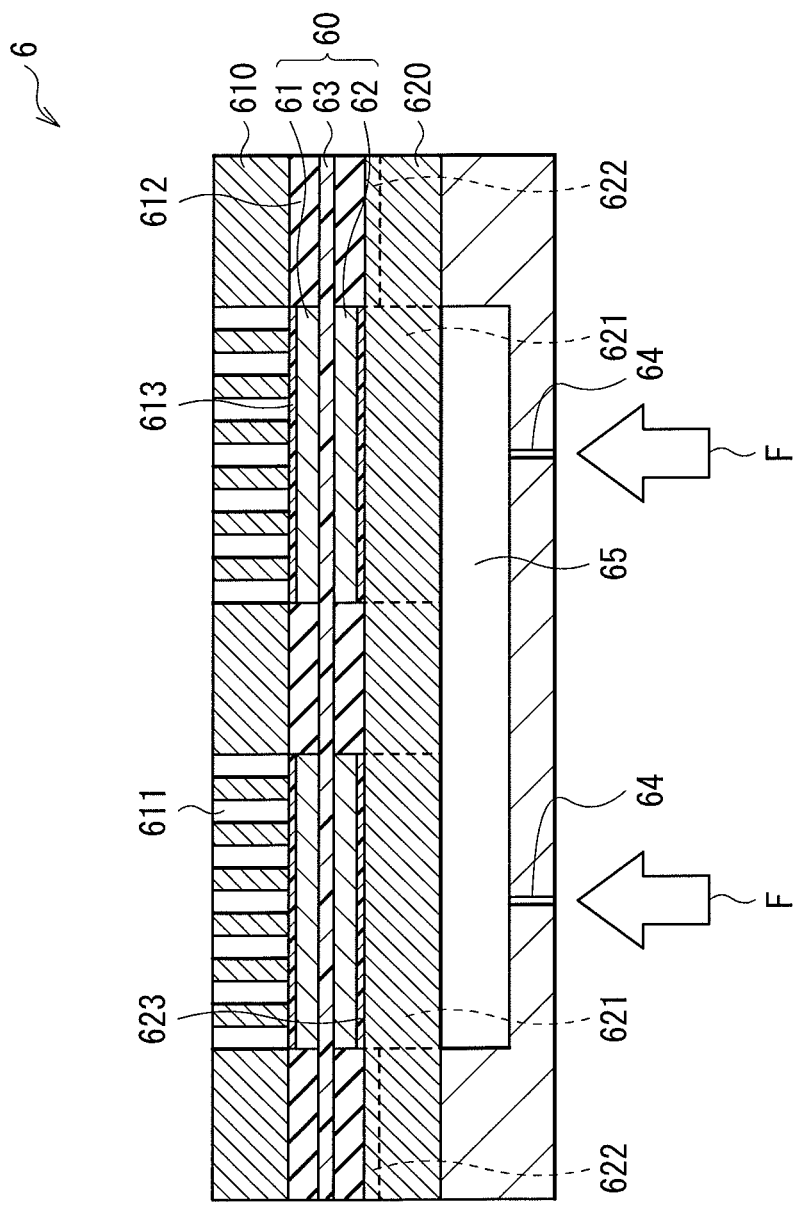

FIG. 16 is a cross-sectional diagram illustrating a schematic configuration of a fuel cell according to an application example of the present disclosure.

DETAILED DESCRIPTION

An embodiment of the present disclosure will be described below in detail with reference to the drawings. It is to be noted that the description will be provided in the following order.
1. Embodiment (an example of application to a drive unit or the like using a polymer actuator device)
2. Modifications (an example of application to a fuel cell etc.)
[Embodiment]
(Schematic Configuration of Electronic Equipment with Image Pickup Unit)

Figure 1:
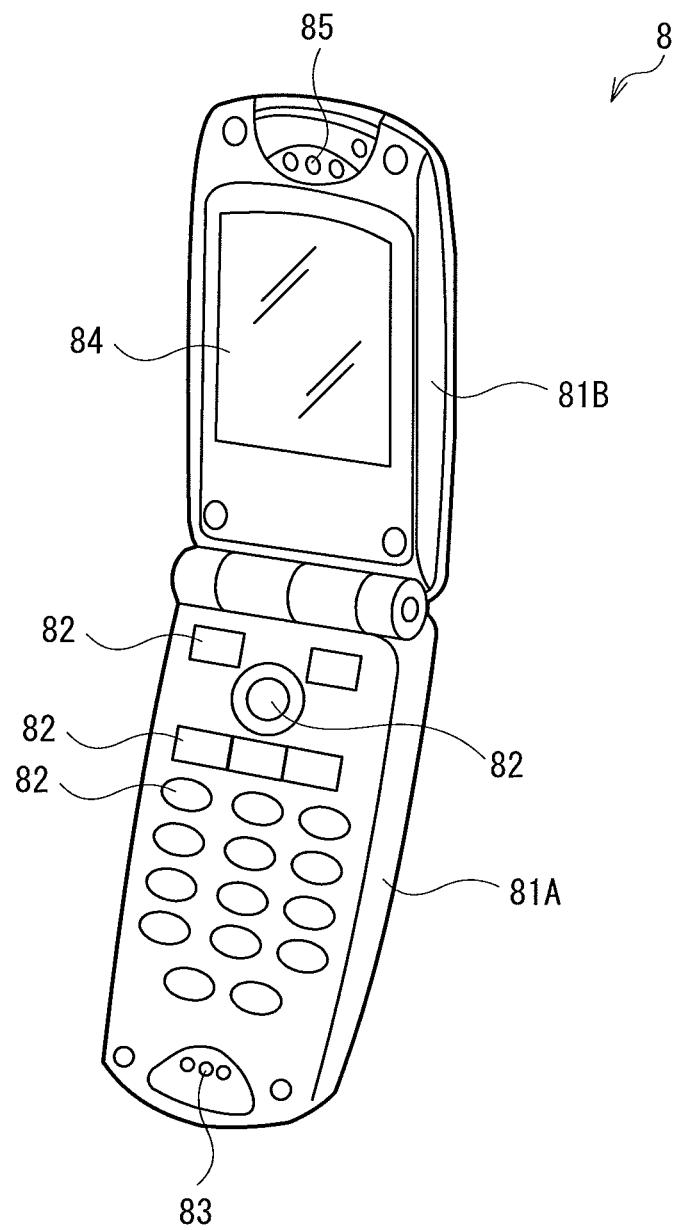
FIG. 1 is a perspective diagram illustrating a configuration example of a piece of electronic equipment with an image pickup unit, according to an embodiment of the present disclosure.
Figure 2:
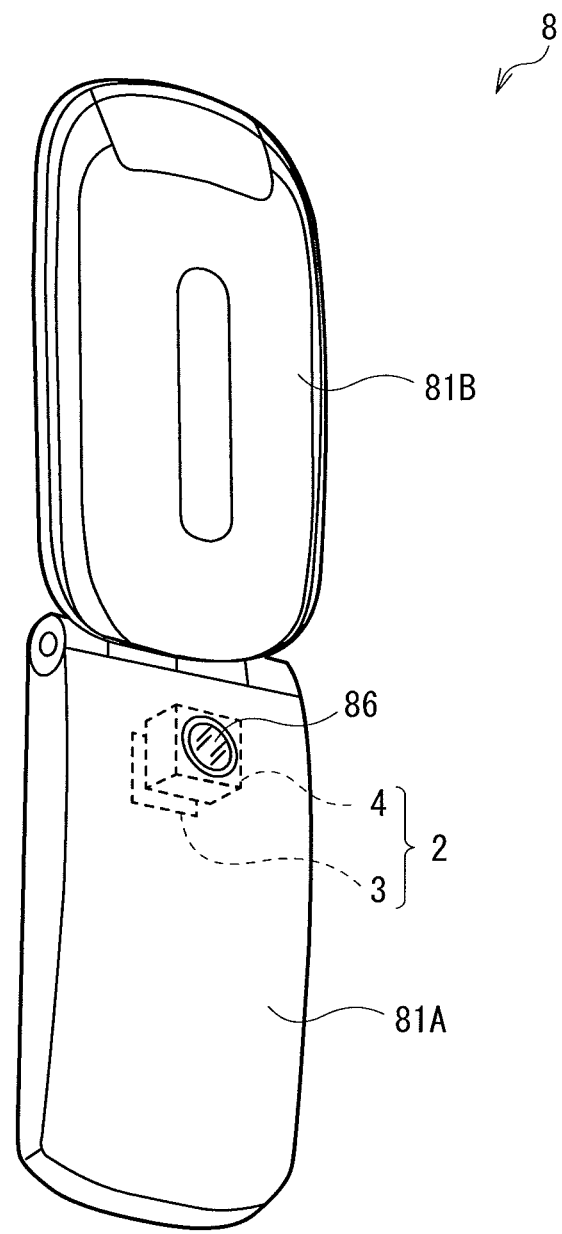
FIG. 2 is a perspective diagram illustrating the piece of electronic equipment illustrated in FIG. 1, viewed from a different direction.

FIG. 1 and FIG. 2 are perspective diagrams each illustrating a schematic configuration of a portable telephone (a portable telephone 8) with an image pickup function, as an example of electronic equipment with an image pickup unit (an image pickup unit 2 which will be described later) according to an embodiment of the present disclosure. In this portable telephone 8, two housings 81A and 81B are foldably coupled together through a hinge mechanism not illustrated.

As illustrated in FIG. 1, in a surface on one side of the housing 81A, various operation keys 82 are disposed, and a microphone 83 is disposed below the operation keys 82. The operation keys 82 are provided to receive predetermined operation by a user and thereby input information. The microphone 83 is provided to input voice of the user during a call and the like.

As illustrated in FIG. 1, a display section 84 using a liquid-crystal display panel or the like is disposed in a surface on one side of the housing 81B, and a speaker 85 is disposed at an upper end thereof The display section 84 displays various kinds of information such as a radio-wave receiving status, a remaining battery, a telephone number of a party on the other end of connection, contents (telephone numbers, names, and the like of other parties) recorded as a telephone book, an outgoing call history, an incoming call history, and the like. The speaker 85 is provided to output voice of a party on the other end of connection during a call and the like.

As illustrated in FIG. 2, a cover glass 86 is disposed in a surface on the other side of the housing 81A, and the image pickup unit 2 is provided at a position corresponding to the cover glass 86 in the housing 81A. This image pickup unit 2 is configured to include a lens module 4 disposed on an object side (the cover glass 86 side), and an image pickup device 3 disposed on an image side (inside of the housing 81A). The image pickup device 3 is a device that acquires an image pickup signal of image formation by a lens (a lens 40 which will be described later) in the lens module 4. This image pickup device 3 is configured by using, for example, an image sensor mounted with a Charge Coupled Device (CCD), a Complementary Metal Oxide Semiconductor (CMOS), or the like.

(Configuration of Image Pickup Unit 2 and Lens Module 4)

Figure 3:
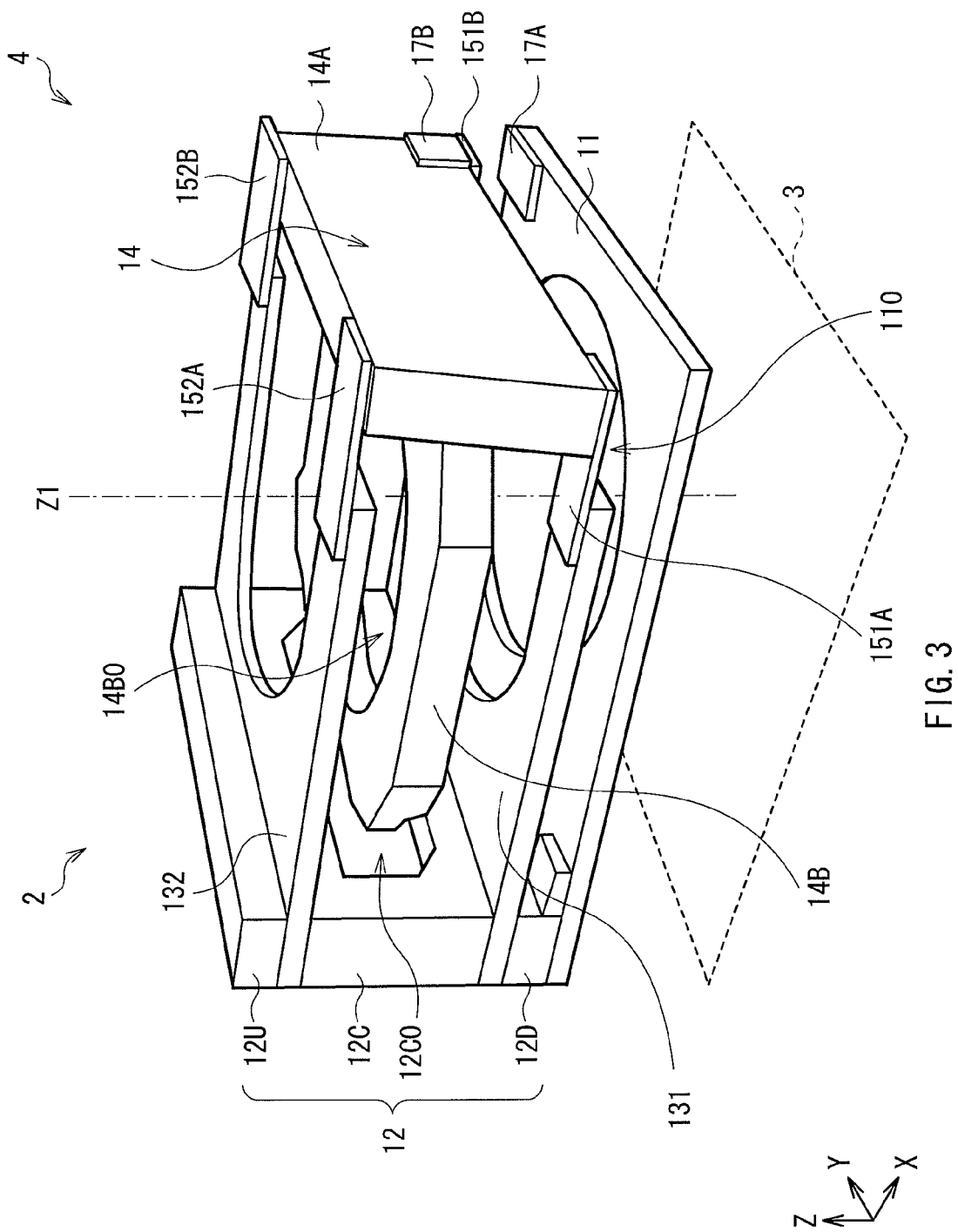
FIG. 3 is a perspective diagram illustrating a configuration of a main part of an image pickup unit depicted in FIG. 2.
Figure 4:
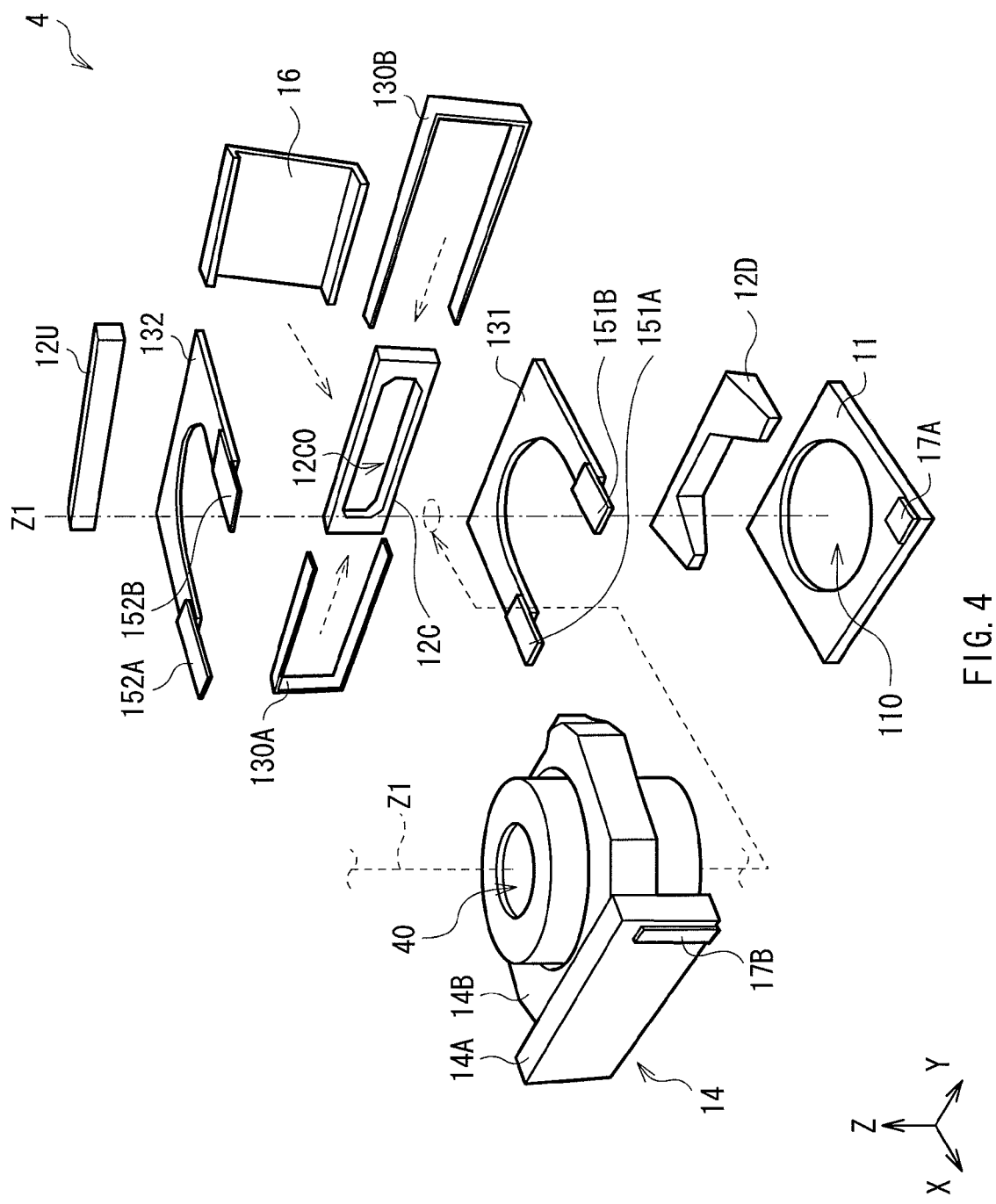
FIG. 4 is an exploded perspective view illustrating a lens module depicted in FIG. 3.
Figure 5A:
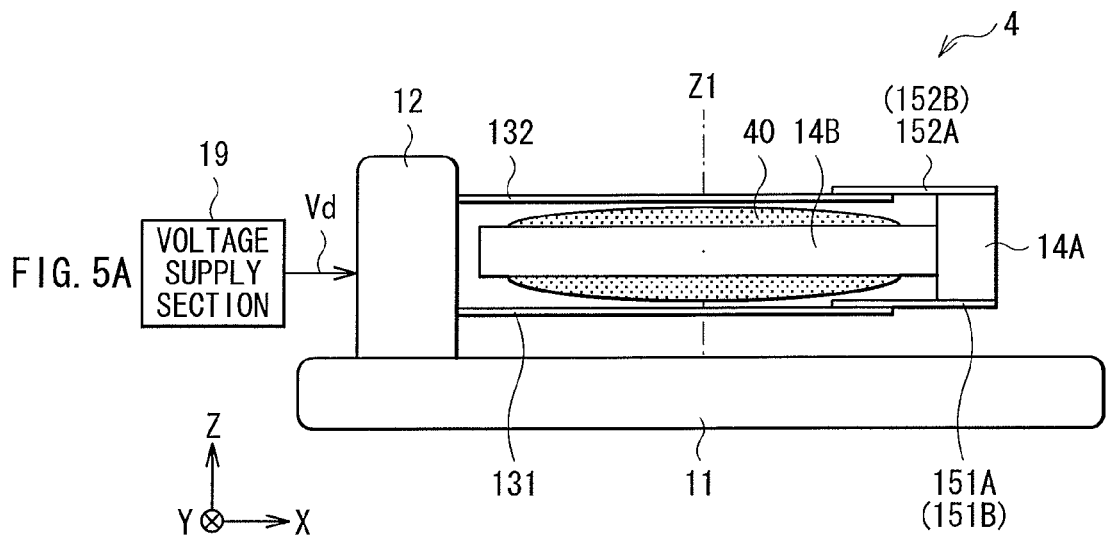
FIGS. 5A and 5B are schematic diagrams illustrating a side configuration and a plane configuration, respectively, of the lens module depicted in FIG. 3.
Figure 5B:
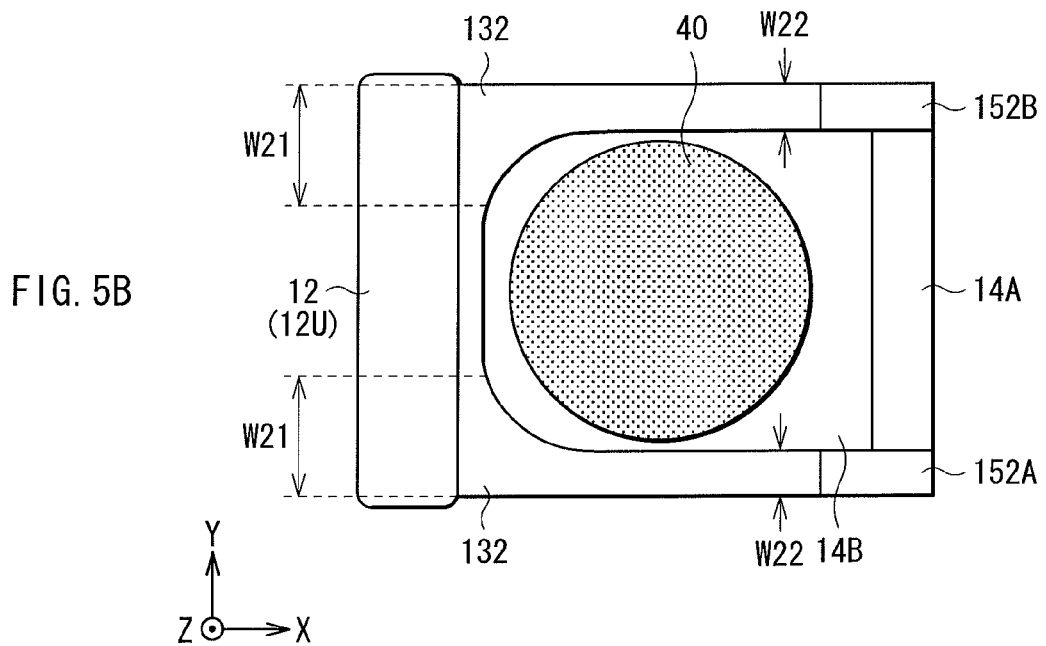

FIG. 3 is a perspective diagram illustrating a configuration of a main part of the image pickup unit 2, and FIG. 4 is an exploded perspective diagram illustrating a configuration of the lens module 4 in this image pickup unit 2. Further, FIGS. 5A and 5B are diagrams each schematically illustrating a configuration of this lens module 4. FIG. 5A is a side view (Z-X side view), and FIG. 5B is a plan view (X-Y plan view).

The lens module 4 includes a support member 11, a polymer actuator device 131, a lens holding member 14, the lens 40, and a polymer actuator device 132, sequentially from the image side (the image pickup device 3 side) to the object side along an optical axis Z1 (in a normal direction of a Z-axis). It is to be noted that in FIG. 3, illustration of the lens 40 is omitted. This lens module 4 further includes a fixing member 12, connection members 151A, 151B, 152A, and 152B, fixed electrodes 130A and 130B, a pressing member 16, and Hall devices 17A and 17B. It is to be noted that a combination of these members of the lens module 4 excluding the lens 40 corresponds to a specific example of "drive unit" (lens drive unit) in the present disclosure.

The support member 11 is a base member (base substrate) supporting the entire lens module 4, and is made of, for example, a hard resin material such as a liquid crystal polymer.

The fixing member 12 is a member fixing one end of each of the polymer actuator devices 131 and 132, and is made of, for example, a hard resin material such as a liquid crystal polymer. This fixing member 12 includes three members; a lower fixing member 12D, a central (middle) fixing member 12C, and an upper fixing member 12U, which are arranged from the image side (a lower part in FIG. 3 and FIG. 4) to the object side (an upper part). The one end of the polymer actuator device 131 and one end of each of the fixed electrodes 130A and 130B are disposed to be interposed between the lower fixing member 12D and the central fixing member 12C. On the other hand, the one end of the polymer actuator device 132 and the other end of each of the fixed electrodes 130A and 130B are disposed to be interposed between the central fixing member 12C and the upper fixing member 12U. In addition, an opening 12C0 that partially holds a part of the lens holding member 14 (a part of a holding section 14B which will be described later) is formed in the central fixing member 12C among these members. This allows the part of the lens holding member 14 to move in this opening 12C0, making it possible to utilize space effectively, thereby downsizing the lens module 4.

Each of the fixed electrodes 130A and 130B is an electrode supplying a driving voltage Vd from a voltage applier (a voltage supply section 19 which will be described later) to electrode films (electrode films 52A and 52B which will be described later) in the polymer actuator devices 131 and 132. Each of the fixed electrodes 130A and 130B is made of, for example, gold (Au), gilt metal, or the like, and is shaped like a letter U. This allows each of the fixed electrodes 130A and 130B to hold a top and a bottom (surfaces on both sides along the Z-axis) of the central fixing member 12C, making it possible to apply the same voltages in parallel with a small number of wires to the pair of polymer actuator devices 131 and 132. Further, in a case where the fixed electrodes 130A and 130B are made of a gilt metallic material, it is possible to prevent deterioration of contact resistance caused by surface oxidation or the like.

The lens holding member 14 is a member holding the lens 40, and is made of, for example, a hard resin material such as a liquid crystal polymer. This lens holding member 14 is disposed to have a center thereof being on the optical axis Z1, and includes the holding section 14B shaped like a ring and holing the lens 40. The lens holding member 14 further includes a connection section 14A supporting this holding section 14B and connecting the holding section 14B to the connection members 151A, 151B, 152A, and 152B which will be described later. Further, the holding section 14B is disposed between drive surfaces, which will be described later, in the pair of polymer actuator devices 131 and 132.

Figure 6:
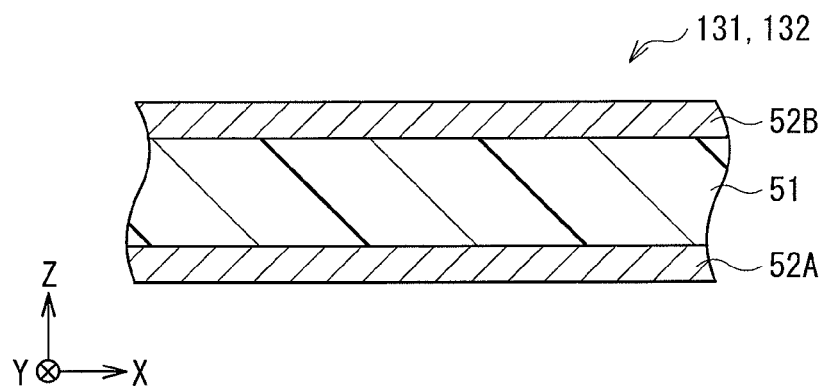
FIG. 6 is a cross-sectional diagram illustrating a detailed structure of a polymer actuator device depicted in FIG. 3.
Figure 7:
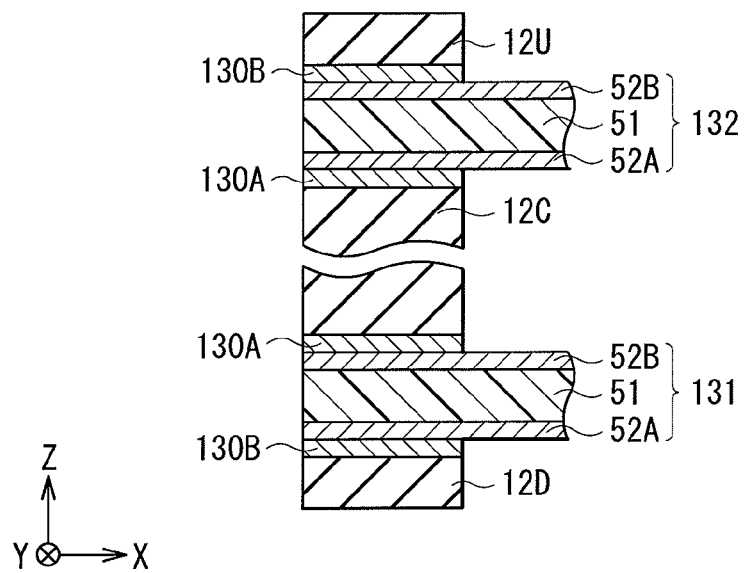
FIG. 7 is a cross-sectional diagram illustrating a detailed structure of part of the polymer actuator device, a fixing member, and a fixed electrode illustrated in FIG. 3.

The polymer actuator devices 131 and 132 each have the drive surface orthogonal to the optical axis Z1 of the lens 40 (the drive surface on an X-Y plane), and are disposed to have the drive surfaces facing each other along this optical axis Z1. Each of the polymer actuator devices 131 and 132 is provided to drive the lens holding member 14 (and the lens 40) along the optical axis Z1, via the connection members 151A, 151B, 152A, and 152B which will be described later. Here, as illustrated in FIG. 5B, each of these polymer actuator devices 131 and 132 has wide parts (widths W21) on the fixing member 12 side, and narrow parts (widths W22) on a movable side (on the connection members 151A, 151B, 152A, and 152B side). It is to be noted that a detailed configuration of the polymer actuator devices 131 and 132 will be described later (FIG. 6 and FIG. 7).

Each of the connection members 151A, 151B, 152A, and 152B is a member linking (connecting) other end of each of the polymer actuator devices 131 and 132 to an end part of the connection section 14A. Specifically, each of the connection members 151A and 151B is configured to connect a lower end part of the connection section 14A to the other end of the polymer actuator device 131, and each of the connection members 152A and 152B is configured to connect an upper end part of the connection section 14A to the other end of the polymer actuator device 132. It is desirable that each of these connection members 151A, 151B, 152A, and 152B be made of, for example, a flexible film such as a polyimide film, and be made of a flexible material having rigidity (bending rigidity) comparable to or less than (preferably, equal to or less than) each of the polymer actuator devices 131 and 132. This allows the connection members 151A, 151B, 152A, and 152B to curve freely in a direction opposite to a curving direction of the polymer actuator devices 131 and 132, and thereby a cross-section in a cantilever including the polymer actuator devices 131 and 132 and the connection members 151A, 151B, 152A, and 152B forms a curve shaped like a letter S. As a result, a parallel displacement of the connection section 14A along the Z-axis direction is allowed, and the holding section 14B (and the lens 40) is driven along the Z-axis direction while keeping a state parallel to the support member 11. It is to be noted that as the rigidity (bending rigidity) mentioned above, a spring constant, for example, may be used.

Each of the Hall devices 17A and 17B is a device used to detect a movement (displacement magnitude) of the lens holding member 14, and is, for example, a combination of a Hall device and a magnet.

Figure 8A:
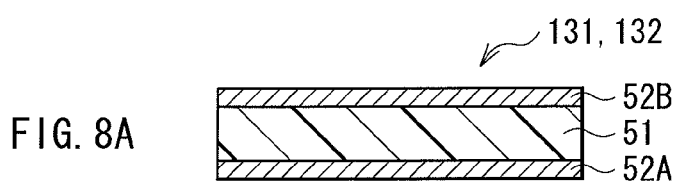
FIGS. 8A and 8B are cross-sectional schematic diagrams illustrating basic operation of the polymer actuator device depicted in FIG. 3.
Figure 8B:
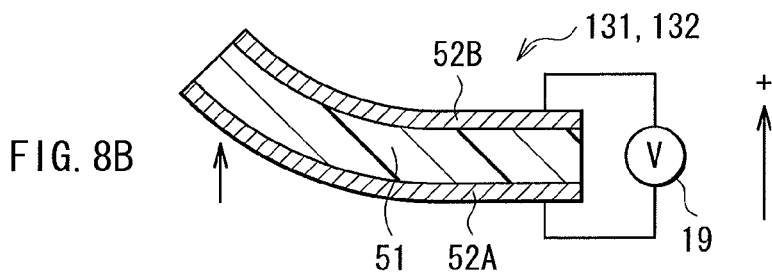

The voltage supply section 19 drives (transforms) the polymer actuator devices 131 and 132, by supplying the driving voltage Vd to the polymer actuator devices 131 and 132, as illustrated in FIG. 5A. Such a voltage supply section 19 is configured using, for example, an electric circuit employing a semiconductor device or the like. It is to be noted that details of drive operation of the polymer actuator devices 131 and 132 by the voltage supply section 19 will be described later (FIGS. 8A and 8B).

(Detailed Configuration of Polymer Actuator Devices 131 and 132)

Next, detailed configuration of the polymer actuator devices 131 and 132 will be described with reference to FIG. 6 and FIG. 7. FIG. 6 illustrates a cross-sectional structure (a Z-X cross-sectional structure) of each of the polymer actuator devices 131 and 132.

Each of these polymer actuator devices 131 and 132 has a cross section structure in which the pair of electrode films 52A and 52B are formed on both sides of an ionic conductive polymer compound film 51 (hereinafter merely referred to as the polymer compound film 51). In other words, each of the polymer actuator devices 131 and 132 has the pair of electrode films 52A and 52B, and the polymer compound film 51 inserted between these electrode films 52A and 52B. It is to be noted that the polymer actuator devices 131 and 132 and the electrode films 52A and 52B may be covered by an insulating protective film made of a material having high elasticity (for example, polyurethane).

Here, as indicated by a cross section (a Z-X cross section) in FIG. 7, in the polymer actuator device 131, the electrode film 52A is electrically connected to the fixed electrode 130B on the lower fixing member 12D side, and the electrode film 52B is electrically connected to the fixed electrode 130A on the central fixing member 12C side. On the other hand, in the polymer actuator device 132, the electrode film 52A is electrically connected to the fixed electrode 130A on the central fixing member 12C side, and the electrode film 52B is electrically connected to the fixed electrode 130B on the upper fixing member 12U side. It is to be noted that although not illustrated in FIG. 7, each member and electrode, from the fixed electrode 130B on the lower fixing member 12D side to the fixed electrode 130B on the upper fixing member 12U side, is fixed as being clamped by the pressing member 16 (flat spring) illustrated in FIG. 4 with constant pressure. This prevents the polymer actuator devices 131 and 132 from being destroyed even when a large force is exerted thereon, and allows stable electrical connection even when these polymer actuator devices 131 and 132 are deformed.

The polymer compound film 51 is configured to be curved by a predetermined potential difference occurring between the electrode films 52A and 52B. This polymer compound film 51 is impregnated with an ionic substance. The "ionic substance" here refers to ions in general capable of conducting in the polymer compound film 51, and specifically indicates a simple substance of hydrogen ions or metal ions, a substance including those cations and/or anions and a polar solvent, or a liquid substance including cations and/or anions such as imidazolium salt. For example, as the former, there is a substance in which a polar solvent is solvated in cations and/or anions, and as the latter, there is an ionic liquid.

As a material of the polymer compound film 51, there is, for example, an ion exchange resin in which a fluorocarbon resin or a hydrocarbon system is a skeleton. As this ion exchange resin, it is preferable to use a cation exchange resin when a cationic substance is impregnated, and use an anion exchange resin when an anionic substance is impregnated.

As the cation exchange resin, there is, for example, a resin into which an acidic group such as a sulfonate group or a carboxyl group is introduced. Specifically, the cation exchange resin is polyethylene having an acidic group, polystyrene having an acidic group, a fluorocarbon resin having an acidic group, or the like. Above all, a fluorocarbon resin having a sulfonate group or a carboxylic acid group is preferable as the cation exchange resin, and there is, for example, Nafion (made by E. I. du Pont de Nemours and Company).

The cationic substance impregnated in the polymer compound film 51 may be organic or inorganic, or any kind. For example, various kinds of substance are applicable, such as a simple substance of metal ions, a substance including metal ions and water, a substance including organic cations and water, or an ionic liquid. As the metal ion, there is, for example, light metal ion such as sodium ion ($Na^+$), potassium ion ($K^+$), lithium ion ($Li^+$), or magnesium ion ($Mg^{2+}$). Further, as the organic cation, there is, for example, alkylammonium ion. These cations exist as a hydrate in the polymer compound film 51. Therefore, in a case where the polymer compound film 51 is impregnated with the cationic substance including cations and water, it is preferable to seal the whole in order to suppress volatilization of the water, in the polymer actuator devices 131 and 132.

The ionic liquid is also called ambient temperature molten salt, and includes cations and anions having low combustion and volatility. As the ionic liquid, there is, for example, an imidazolium ring system compound, a pyridinium ring system compound, or an aliphatic compound.

Above all, it is preferable that the cationic substance be the ionic liquid. This is because the volatility is low, and the polymer actuator devices 131 and 132 operate well even in a high-temperature atmosphere or in a vacuum.

Each of the electrode films 52A and 52B facing each other with the polymer compound film 51 interposed therebetween includes one or more kinds of conductive material. It is preferable that each of the electrode films 52A and 52B be a film in which particles of a conductive material powder are bound by an ionic conductive polymer, because flexibility of the electrode films 52A and 52B increases. A carbon powder is preferable as the conductive material powder, because the carbon powder has a high conductivity and a large specific surface area, thereby achieving a larger deformation volume. As the carbon powder, Ketjen black is preferable. As the ionic conductive polymer, a material (here, a material including an ion exchange resin) similar to that of the polymer compound film 51 is desirable.

The electrode films 52A and 52B are formed as follows, for example. A coating in which a conductive material powder and an ionic conductive polymer are dispersed in a dispersion medium is applied to both sides of the polymer compound film 51, and then dried. Alternatively, a film-shaped substance including a conductive material powder and an ionic conductive polymer may be affixed to both sides of the polymer compound film 51 by pressure bonding.

The electrode films 52A and 52B may each have a multi-layer structure, and in that case, it is preferable that each of the electrode films 52A and 52B have such a structure that a layer in which particles of a conductive material powder are bound by an ionic conductive polymer and a metal layer are laminated sequentially from the polymer compound film 51 side. This allows an electric potential to be closer to a further uniform value in an in-plane direction of the electrode films 52A and 52B, thereby achieving excellent deformability. As a material of the metal layer, there is a noble metal such as gold or platinum. A thickness of the metal layer is arbitrary, but a continuous film allowing the electric potential to become uniform in the electrode films 52A and 52B is preferable. As a method of forming the metal layer, there is plating, deposition, sputtering, or the like.

A size (width and length) of the polymer compound film 51 may be freely set, according to a size and a weight of an object to be driven (here, the lens holding member 14 and the like), or a desirable displacement magnitude (deformation volume) of the polymer compound film 51. The displacement magnitude of the polymer compound film 51 is set according to, for example, a desired displacement magnitude (a movement along the optical axis Z1) of the object to be driven.

(Detailed Configuration of Ion Exchange Resin)

Here, each of the polymer actuator devices 131 and 132 of the present embodiment is configured using an ion exchange resin containing a moisturizing agent. Specifically, such an ion exchange resin containing the moisturizing agent is used in one or more of the electrode films 52A and 52B and the polymer compound film 51, or preferably, in all of the electrode films 52A and 52B and the polymer compound film 51. To be more specific, in a case where each of the polymer actuator devices 131 and 132 is in a three-layer structure including the electrode film 52A (made of a mixed layer including a conductive material and an ion exchange resin)/the polymer compound film 51 (including an ion exchange resin)/the electrode film 52B (made of a mixed layer including a conductive material and an ion exchange resin), the ion exchange resin containing the moisturizing agent is used in one or more of these three layers, or desirably in all of these three layers.

Further, it is preferable that the above-described ion exchange resin containing the moisturizing agent be selectively used in the polymer compound film 51 among the electrode films 52A and 52B and the polymer compound film 51. Alternatively, in a case where the ion exchange resin containing the moisturizing agent is used in all of these three layers, it is preferable that a content of the moisturizing agent in the polymer compound film 51 be more than a content of the moisturizing agent in the electrode films 52A and 52B. This is because, although details will be described later, a decline in ionic conductivity in an environment at a low humidity, a high temperature, or the like is more effectively suppressed, compared to a contrary case where the above-described ion exchange resin containing the moisturizing agent is selectively used in the electrode films 52A and 52B, or the content of the moisturizing agent in the electrode films 52A and 52B is more than the content of the moisturizing agent in the polymer compound film 51.

Here, such a moisturizing agent is made of, for example, a water molecule adsorbent capable of holding water molecules by physisorption or chemisorption or both of these types of adsorption. Further, for example, this water molecule adsorbent may be configured using porous fine particles each having multiple pores on a surface and in inside thereof (the pores each having a diameter of about 0.3 nm or more). In such porous fine particles, the pores are filled with water molecules (the water molecules in a solid state, a liquid state, a vapor state, or a state where two or more of these states are mixed). Specifically, the pores of the porous fine particles are in a condition of being filled with the water molecules up to, for example, a saturated amount of water, by causing the water molecules to contact the porous fine particles in such a state. For example, as such porous fine particles, there are particles including one or more kinds of zeolite, silica (silicon dioxide), and carbon. Of these, a content of the zeolite in the ion exchange resin is desirably about 0.25 wt % or more and about 1.00 wt % or less both inclusive, and is further desirably about 0.50 wt %. This is because, although details will be described later, a decline in ionic conductivity in an environment at a low humidity, a high temperature, or the like is suppressed more effectively.

Further, as the water molecule adsorbent used to form the moisturizing agent, there is, for example, an adsorbent using a hydrophilic organic compound, a deliquescent substance, or the like, other than the porous fine particles described above. As the water molecule adsorbent using the hydrophilic organic compound, there is, for example, sorbitol, a superabsorbent polymer, hydrogel, or the like. Further, as the water molecule adsorbent using the deliquescent substance, there is, for example, calcium chloride, magnesium chloride, citric acid, potassium carbonate, or the like.

Here, when a content of the water molecule adsorbent in such an ion exchange resin is assumed to be W, and a water content in the water molecule adsorbent is assumed to be A, setting satisfying the following expression (1) is desirable. This is because, although details will be described later, a decline in ionic conductivity in an environment at a low humidity, a high temperature, or the like is suppressed more effectively. It is to be noted that the content W of the water molecule adsorbent here is defined by, for example, a dry weight of the contained (added) water molecule adsorbent when a weight of the ion exchange resin at humidity (relative humidity) of about 30% is assumed to be 1. Further, the water content A here is defined by the following expression (2), when a weight of the water molecule adsorbent at a relative humidity of about 30% is assumed to be M, and the dry weight of the water molecule adsorbent is assumed to be m, for example.

$$W > (0.0005/A) \quad (1)$$

$$A = (M-m)/m \quad (2)$$

Furthermore, in the present embodiment, it is desirable that an ion exchange equivalent weight (an Equivalent Weight (EW) value) in such an ion exchange resin containing the moisturizing agent be about 800 [g/eq] or less. This is because, although details will be described later, a decline in ionic conductivity in an environment at a low humidity, a high temperature, or the like is suppressed more effectively.

(Operation and Effect of Image Pickup Unit 2)

Subsequently, operation and effect of the image pickup unit 2 of the present embodiment will be described.

(1. Operation of Polymer Actuator Devices 131 and 132)

First, operation of the polymer actuator devices 131 and 132 will be described with reference to FIGS. 8A and 8B. FIGS. 8A and 8B each schematically illustrate the operation of the polymer actuator devices 131 and 132, using a cross-sectional diagram.

At first, there will be described a case where a substance including cations and a polar solvent is used as the cationic substance.

In this case, the cationic substance disperses approximately uniformly in the polymer compound film 51 and thus, the polymer actuator devices 131 and 132 in a state of no voltage application become flat without curving (FIG. 8A). Here, when a voltage applied state is established by the voltage supply section 19 illustrated in FIG. 8B (application of the driving voltage Vd begins), the polymer actuator devices 131 and 132 exhibit the following behavior. When, for example, the predetermined voltage Vd is applied between the electrode films 52A and 52B thereby allowing the electrode film 52A to be at a negative potential whereas the electrode film 52B to be at a positive potential, the cations in a state of being solvated in the polar solvent move to the electrode film 52A side. At this moment, anions hardly move in the polymer compound film 51 and thus, in the polymer compound film 51, the electrode film 52A side swells, while the electrode film 52B side shrinks. As a result, the polymer actuator devices 131 and 132 curve toward the electrode film 52B side as a whole, as illustrated in FIG. 8B. Subsequently, when the state of no voltage application is established by eliminating the potential difference between the electrode films 52A and 52B (the application of the driving voltage Vd is stopped), the cationic substance (the cations and the polar solvent) localized to the electrode film 52A side in the polymer compound film 51 disperse, and return to the state illustrated in FIG. 8A. Further, when the predetermined driving voltage Vd is applied between the electrode films 52A and 52B thereby allowing the electrode film 52A to shift to a positive potential and the electrode film 52B to shift to a negative potential, from the state of no voltage application illustrated in FIG. 8A, the cations in the state of being solvated in the polar solvent move to the electrode film 52B side. In this case, in the polymer compound film 51, the electrode film 52A side shrinks while the electrode film 52B side swells and thus, as a whole, the polymer actuator devices 131 and 132 curve toward the electrode film 52A side.

Next, there will be described a case where an ionic liquid including liquid cations is used as the cationic substance.

In this case, similarly, in the state of no voltage application, the ionic liquid is dispersed in the polymer compound film 51 approximately uniformly and thus, the polymer actuator devices 131 and 132 become flat as illustrated in FIG. 8A. Here, when a voltage applied state is established by the voltage supply section 19 (application of the driving voltage Vd begins), the polymer actuator devices 131 and 132 exhibit the following behavior. When, for example, the predetermined driving voltage Vd is applied between the electrode films 52A and 52B thereby allowing the electrode film 52A to be at a negative potential whereas the electrode film 52B to be at a positive potential, the cations of the ionic liquid move to the electrode film 52A side, and anions hardly move in the polymer compound film 51 which is a cation-exchanger membrane. For this reason, in the polymer compound film 51, the electrode film 52A side swells, while the electrode film 52B side shrinks. As a result, the polymer actuator devices 131 and 132 curve toward the electrode film 52B side as a whole, as illustrated in FIG. 8B. Subsequently, when the state of no voltage application is established by eliminating the potential difference between the electrode films 52A and 52B (the application of the driving voltage Vd is stopped), the cations localized to the electrode film 52A side in the polymer compound film 51 disperse, and return to the state illustrated in FIG. 8A. Further, when the predetermined driving voltage Vd is applied between the electrode films 52A and 52B thereby allowing the electrode film 52A to shift to a positive potential and the electrode film 52B to shift to a negative potential, from the state of no voltage application illustrated in FIG. 8A, the cations of the ionic liquid move to the electrode film 52B side. In this case, in the polymer compound film 51, the electrode film 52A side shrinks, whereas the electrode film 52B side swells and thus, as a whole, the polymer actuator devices 131 and 132 curve toward the electrode film 52A side.

(2. Operation of Lens Module 4)

Subsequently, operation of the entire image pickup unit 2 (the lens module 4) will be described with reference to FIGS. 9A and 9B. FIGS. 9A and 9B each illustrate the operation of the lens module 4 in the image pickup unit 2 in a cross-sectional diagram. FIG. 9A illustrates a state before the operation, and FIG. 9B illustrates a state after the operation.

In this lens module 4, as illustrated (by arrows) in FIGS. 9A and 9B, the lens 40 becomes movable along the optical axis Z1, by driving the lens holding member 14 through use of the pair of polymer actuator devices 131 and 132. In this way, in the lens module 4, the lens 40 is driven along the optical axis Z1 by a drive unit (a lens drive unit) employing the polymer actuator devices 131 and 132.

(3. Effect of Ion Exchange Resin)

Incidentally, as for a polymer actuator device that operates using a phenomenon of ionic migration in an ion conductive resin (ion exchange resin), in general, its characteristics might deteriorate depending on an ambient environment, as mentioned earlier.

Here, specifically, examples of such a characteristic deterioration include, first of all, a reduction in response speed in a low humidity environment (in a dry environment). This results from a decline in ionic conductivity in the ion exchange resin in the low humidity environment. Conceivable measures against this include techniques such as laminating the entire polymer actuator device with an impervious film, or using the polymer actuator device in a water solution, in order to prevent the ion exchange resin from drying. However, these techniques have such a disadvantage that operation of the polymer actuator device may be inhibited, or a use environment may be limited. Further, as another example of the characteristic deterioration in the polymer actuator device depending on the ambient environment, there is a reduction in displacement magnitude (deformation volume) after storage in a high temperature environment. This is considered to be denaturation by a dehydration reaction of a functional group in the ion exchange resin (see pages 56 to 59, in "Temperature-dependent structure changes in Nafion ionomer studied by PCMW2D IR correlation spectroscopy", Journal of Molecular Structure, 974 (2010), by Shigeaki Morita and Kuniyuki Kitagawa).

Thus, the polymer actuator devices 131 and 132 of the present embodiment are configured using the ion exchange resin containing the moisturizing agent, as described above. Specifically, such an ion exchange resin containing the moisturizing agent is used in one or more of the electrode films 52A and 52B and the polymer compound film 51, and desirably in all of the electrode films 52A and 52B and the polymer compound film 51. This suppresses a decline in the ionic conductivity in the ion exchange resin, even in the environment at a low humidity, a high temperature, or the like mentioned above. As a result, in the polymer actuator devices 131 and 132 of the present embodiment, the characteristic deterioration depending on the ambient environment (for example, the reduction in the response speed in the low humidity environment, the reduction in the displacement magnitude after the storage in the high temperature environment, and the like, as described above) is suppressed.

(4. Examples)

Here, specific examples (Examples 1 to 4) of such polymer actuator devices 131 and 132 will be described, in comparison with a comparative example (an example of using an ion exchange resin that does not contain the above-described moisturizing agent).

Example 1

Figures 10A, 10B:
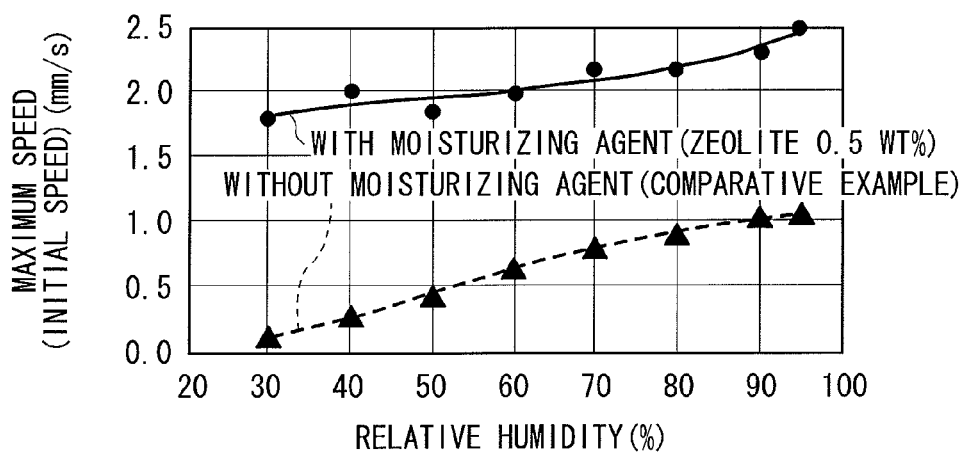
FIGS. 10A and 10B are diagrams illustrating experimental results according to Example 1 and a comparative example.

FIGS. 10A and 10B each illustrate experimental results of Example 1 and the comparative example. Specifically, FIG. 10A illustrates each kind of moisturizing agent, each material name, an amount (content) of each moisturizing agent added, each average response speed of a polymer actuator device (a relative value when the comparative example was assumed to be a reference (100%)), in the comparative example and in each example (examples in each of which a water molecule adsorbent having an effect of chemisorption or physisorption was mainly used as a moisturizing agent). FIG. 10B illustrates a relationship between a relative speed and a maximum speed (initial speed) for each of the comparative example (containing no moisturizing agent) and one of the examples (i.e., the example where zeolite with an added amount of about 0.5 wt % is used as the moisturizing agent). Incidentally, here, an average response speed and an initial speed, which were in a period of about 0.5 seconds when a voltage of 1V was applied to the polymer actuator device in an environment at a relative humidity of about 30%, were used as the average response speed and the maximum speed. Incidentally, in this Example 1, the moisturizing agent (water molecule adsorbent) was selectively used in the electrode films 52A and 52B, among the electrode films 52A and 52B and the polymer compound film 51.

As illustrated in FIG. 10A, it was found that in any of the examples where sorbitol (an added amount=about 5 wt %) and calcium chloride (an added amount=about 5 wt %) mainly having the effect of chemisorption were used, and the examples where a water absorptive polymer (an added amount=about 10 wt %), zeolite (an added amount=about 0.5 wt %), and silica (an added amount=about 5 wt %) mainly having the effect of physisorption were used, as the water molecule adsorbent of the moisturizing agent, the average response speed was improved (an improvement of about 7% to about 60%) as compared to the comparative example. Therefore, it was confirmed that a reduction in the response speed of the polymer actuator device in the low humidity environment was suppressed by using the ion exchange resin containing the moisturizing agent.

Further, it was found that use of the zeolite as the moisturizing agent was desirable in particular, because in the example where the zeolite (the added amount=about 0.5 wt %) was used as the water molecule adsorbent of the moisturizing agent, a particularly great improvement in the average response speed was achieved even though the added amount was small. Furthermore, as illustrated in FIG. 10B, it was found that in this example where the zeolite (the added amount=about 0.5 wt %) was used, the maximum speed (initial speed) was improved (an improvement of about 1.0 to about 1.5 [mm/s]) in a full humidity range in which the relative humidity is about 30% to about 95%, as compared to the comparative example.

Example 2

FIGS. 11A to 11C each illustrate experimental results according to Example 2. Specifically, FIG. 11A illustrates a relationship between an added amount (content) and a response speed of a polymer actuator device, in an example where sorbitol was used as the water molecule adsorbent of the moisturizing agent. FIG. 11B illustrates a relationship between an added amount and a response speed of a polymer actuator device, in an example where silica was used as the water molecule adsorbent of the moisturizing agent. FIG. 11C illustrates a relationship between an added amount and a response speed of a polymer actuator device, in an example where zeolite was used as the water molecule adsorbent of the moisturizing agent. It is to be noted that "V30", "V50", and "(V30/V50)" illustrated in the figures indicate a response speed at a relative humidity of about 30%, a response speed at a relative humidity of about 50%, and a relative ratio between these V30 and V50, respectively.

Figure 12:
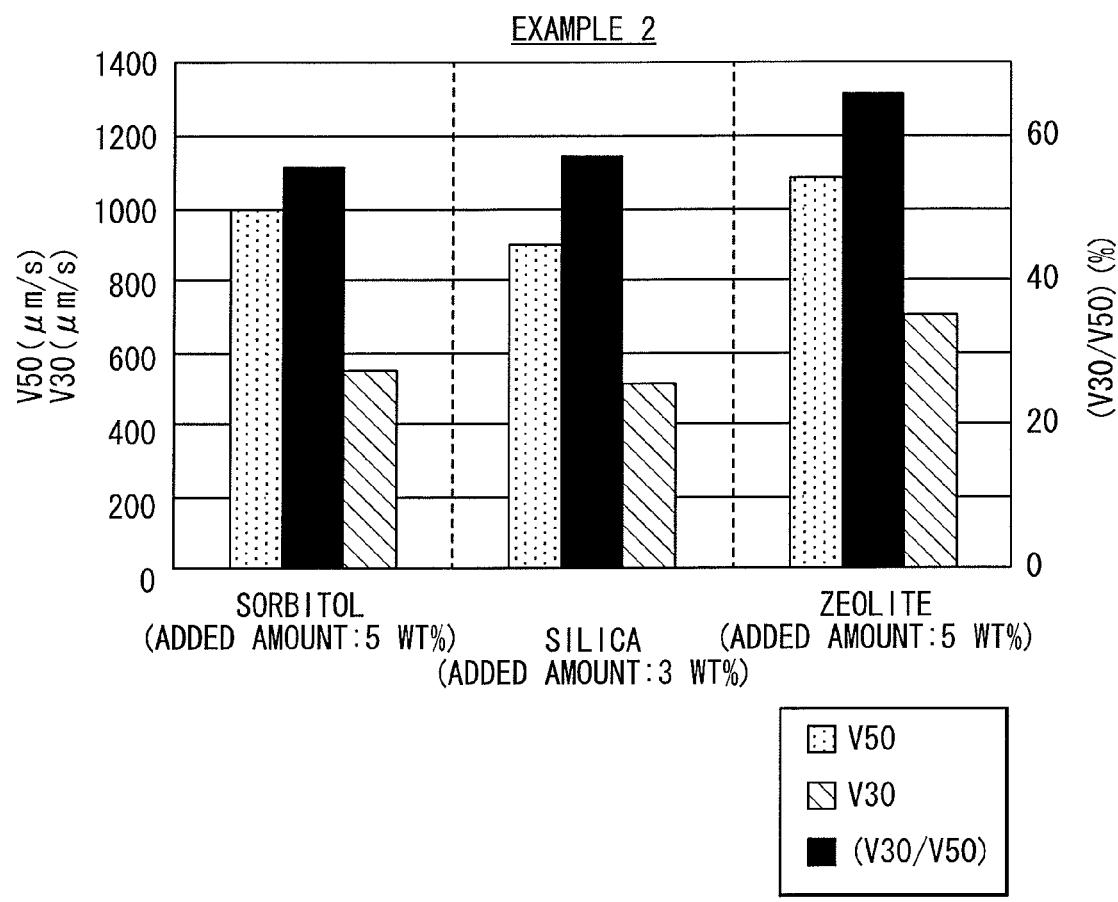
FIG. 12 is a diagram illustrating a part of each of the experimental results depicted in FIG. 11 together.

As illustrated in these FIGS. 11A to 11C, a value of each of response speed parameters (V30, V50, and (V30/V50)) described above changes to some extent as the added amount of the water molecule adsorbent varies, and there is a range of particularly desirable added amounts for an effect of an improvement in the response speed. Specifically, in the example of zeolite illustrated in FIG. 11C, as described earlier, the added amount is desirably about 0.25 wt % or more and about 1.00 wt % or less both inclusive, and more desirably, the added amount is about 0.50 wt %. Incidentally, the respective parameters of V30, V50, and (V30/V50) were summarized in FIG. 12, for each of the example of sorbitol (an added amount=about 5 wt %), the example of silica (an added amount=about 3 wt %), and the example of zeolite (an added amount=about 0.5 wt %).

Further, in an environment at a certain humidity, a ratio T of water molecules held in a polymer actuator device by a moisturizing agent (namely, a weight of the water molecules when a weight of the polymer actuator device is assumed to be 1) is defined by the following expression (3), using the above-described content W of the water molecule adsorbent in the ion exchange resin and the above-described water content A in the water molecule adsorbent.

$$T = A \times W \quad (3)$$

Here, zeolite adsorbs water molecules of approximately 20 wt % in an environment at a relative humidity of about 30%. Further, it was found from this Example 2 that as compared to the comparative example, an effect of an improvement in the response speed (a response speed when the relative humidity was about 30%: V30) was achieved when the added amount of zeolite was about 0.25 wt % or more. Therefore, in the environment at the relative humidity of about 30%, the ratio T of the water molecules held in the polymer actuator device by the moisturizing agent (zeolite, whose added amount is about 0.25 wt %) is, approximately, 0.0005 (T=0.2× 0.0025=0.0005).

Similarly, silica adsorbs water molecules of approximately 5 wt % in the environment at the relative humidity of about 30%. Further, it was found from this Example 2 that as compared to the comparative example, an effect of an improvement in the response speed (V30) was achieved when the added amount of silica was about 1 wt % or more. Therefore, in the environment at the relative humidity of about 30%, the ratio T of the water molecules held in the polymer actuator device by the moisturizing agent (silica, whose added amount is about 1 wt %) is, approximately, 0.0005 (T=0.05× 0.001=0.0005).

It is apparent from these results that in order to achieve an effect of an improvement in the response speed with the moisturizing agent, water molecules having a weight of about 0.0005 or more may be held by the moisturizing agent, in a polymer actuator having a weight of about 1 (T=A× W≥0.0005). In other words, setting that satisfies the above-described expression (1) is desirable.

Example 3

Figures 13A, 13B:
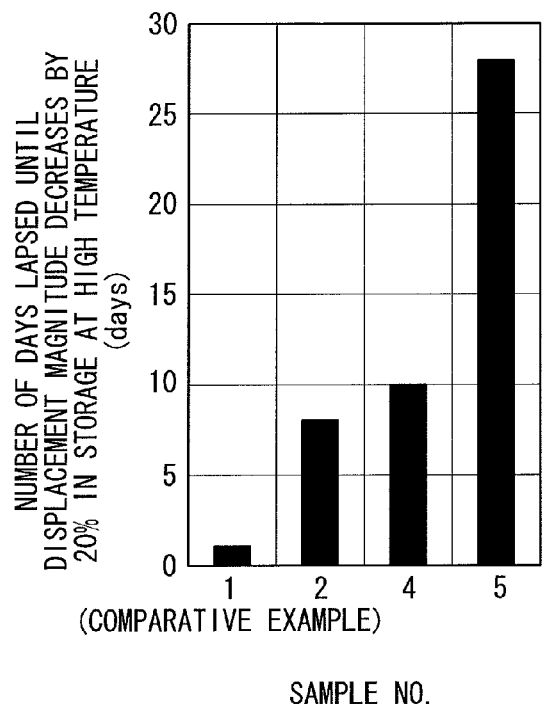
FIGS. 13A and 13B are diagrams illustrating experimental results according to Example 3 and the comparative example.

FIGS. 13A and 13B each illustrate experimental results according to Example 3 and the comparative example. Specifically, FIG. 13A illustrates the above-described EW value, an amount (content) of a moisturizing agent added to the electrode films 52A and 52B, an amount of a moisturizing agent added to the polymer compound film 51, and the number of days lapsed until a displacement magnitude of a polymer actuator device in storage at a high temperature (about 85° C.) decreases by about 20%, in each of sample numbers 1 (the comparative example), 2, 4, and 5 (examples). FIG. 13B illustrates the above-mentioned number of days for the example represented by each of the sample numbers. In this Example 3, zeolite was used as the moisturizing agent (water molecule adsorbent).

It is apparent from these FIGS. 13A and 13B that in particular, the number of days after the storage at the high temperature is large in the example (the sample number 5) where the ion exchange resin containing the moisturizing agent is used in the polymer compound film 51 in addition to the electrode films 52A and 52B, as compared to the examples (the sample numbers 2 and 4) in each of which the ion exchange resin containing the moisturizing agent is selectively used in the electrode films 52A and 52B. From this, it was confirmed that the moisturizing agent contained in the polymer compound film 51 exhibited an effect much higher than that of the moisturizing agent added to other parts. Therefore, it is easily presumed that from a viewpoint of characteristic maintenance after storage in a high temperature environment, it is desirable to use the ion exchange resin containing the moisturizing agent selectively in the polymer compound film 51, and to make the content of the moisturizing agent in the polymer compound film 51 larger than the content of the moisturizing agent in the electrode films 52A and 52B.

Example 4

Parts (A) and (B) of FIG. 14 and FIG. 15 illustrate experimental results according to Example 4 and the comparative example. Specifically, Parts (A) and (B) of FIG. 14 illustrate an EW value, an amount (content) of a moisturizing agent added to the electrode films 52A and 52B, an amount of a moisturizing agent added to the polymer compound film 51, and a displacement magnitude of a polymer actuator device after storage (1,000 hours) in a high temperature (about 85° C., a relative humidity of about 50%) environment (namely, a relative value when a displacement magnitude before high temperature storage is about 100%), in each of the sample numbers 1 (the comparative example), 2 to 5 (examples). FIG. 15 illustrates a relationship between an elapsed time in the high temperature storage and the displacement magnitude after the high temperature storage, for each of the example indicated by the sample number 3 (the EW value=about 1050 [g/eq]) and the example indicated by the sample number 5 (the EW value=about 780 [g/eq]). Incidentally, also in this Example 4, zeolite was used as the moisturizing agent (water molecule adsorbent).

It was found from these Parts (A) and (B) of FIG. 14 and FIG. 15 that in order to make the displacement magnitude after the high temperature storage be about 50% or more, it was desirable to include the moisturizing agent in the electrode films 52A and 52B or both the electrode films 52A and 52B and the polymer compound film 51 (desirably, all of the electrode films 52A and 52B and the polymer compound film 51), and also use the ion exchange resin having the EW value of about 800 [g/eq] or less (here, about 780 [g/eq]). In other words, it was confirmed that from a viewpoint of suppression of a reduction in the displacement magnitude after the storage in the high temperature environment, the ion exchange equivalent weight (EW value) in the ion exchange resin containing the moisturizing agent was desirably about 800 [g/eq] or less, as described earlier.

As described above, in the present embodiment, the polymer actuator devices 131 and 132 are configured using the ion exchange resin containing the moisturizing agent and thus, it is possible to suppress a decline in the ionic conductivity in the ion exchange resin in an environment at a low humidity, a high temperature, or the like. Therefore, it is possible to suppress the characteristic deterioration depending on an ambient environment (for example, a reduction in response speed in a low humidity environment, a decline in displacement magnitude after storage in a high temperature environment, and the like), thereby also improving reliability.

[Modifications]

The present technology has been described by using the embodiment and Examples, but is not limited to these embodiment and the like, and may be variously modified.

For example, each of the connection section 14A and the connection members 151A, 151B, 152A, and 152B described in the embodiment and the like may not be provided in some cases. Further, the embodiment and the like have been described for the case where the one end side of the polymer actuator devices 131 and 132 is directly fixed by the fixing member 12, but this case is not a limitation. In other words, the one end side of the polymer actuator device may be indirectly fixed by a fixing member (via the fixed electrode and the like).

Further, the embodiment and the like have been described for the case where the pair of polymer actuator devices are provided, but the polymer actuator devices may not be a pair, and one or more than three polymer actuator devices may be provided.

Furthermore, the shape of the polymer actuator device is not limited to that in each of the embodiment and the like and also, the layered structure thereof is not limited to that described in each of the embodiment and the like, and may be modified as appropriate. Moreover, the shape, material, and the like of each member in the lens module (drive unit) also are not limited to those described in the embodiment and the like.

In addition, the earlier-described embodiment and the like have been described by taking the lens drive unit that drives the lens along the optical axis, as an example of the drive unit according to an embodiment of the present disclosure, but this case is not a limitation. For example, the lens drive unit may be configured to drive the lens along a direction orthogonal to the optical axis. Further, the drive unit according to the earlier-described embodiments of the present disclosure is applicable to, other than such a lens drive unit, a drive unit or the like that drives a diaphragm etc. (see Japanese Unexamined Patent Application Publication No. 2008-259381 and the like). Furthermore, the drive unit, the lens module, and the image pickup unit according to an embodiment of the present disclosure are applicable to various kinds of electronic equipment, other than the portable telephone described in the earlier-described embodiment and the like.

(Example of Application to Fuel Cell Etc.)

The earlier-described embodiment and the like have been described by taking the drive unit (lens drive unit), the lens module, and the image pickup unit provided with the polymer actuator device, as application examples of the ion exchange resin according to an embodiment of the present disclosure, but these are not limitations. In other words, the ion exchange resin according to an embodiment of the present disclosure may be applied to devices (for example, a fuel cell) other than the polymer actuator device.

FIG. 16 illustrates a schematic configuration of a fuel cell (a fuel cell 6) according to another application example of the present disclosure, in a cross-sectional diagram. This fuel cell 6 is configured to include one or more power generation sections (here, one power generation section 60), and a fuel pump (a fuel supply section) as well as a fuel tank which are not illustrated. The power generation section 60 is, for example, a direct methanol power generation section that generates electricity by a reaction between methanol and oxidant gas (for example, oxygen), and is configured by linking a plurality of unit cells each having a cathode electrode (an oxygen electrode) 61 and an anode electrode (a fuel electrode) 62. The fuel tank stores liquid fuel (for example, methanol or a methanol water solution) for power generation therein. The fuel pump is a pump drawing the liquid fuel stored in the fuel tank and supplying (conveying) the liquid fuel to the power generation section 60 side. The fuel pump is configured using a piezoelectric substance or the like. Operation (operation of supplying the liquid fuel) of this fuel pump is controlled by a control section not illustrated.

In this fuel cell 6, the power generation section 60 is configured to have an electrolyte film 63 interposed between the cathode electrode 61 and the anode electrode 62. For example, six unit cells (three rows×two columns) each including such a power generation section 60 are provided in an in-plane direction, and electrically connected in series by a connection member not illustrated. A cathode-side flat member 610 and an anode-side flat member 620 are provided on the cathode electrode 61 side and the anode electrode 62 side of the power generation section 60, respectively.

Each of the cathode electrode 61 and the anode electrode 62 is, for example, quadrilateral, and has a configuration in which a micro porous layer (MPL) and a catalytic layer including a catalyst such as platinum (Pt) or ruthenium (Ru) are formed in a collector made of carbon paper or the like. The catalytic layer is made of, for example, a material in which a support such as carbon black supporting a catalyst is dispersed in a polyperfluoroalkyl sulfonic acid-based proton conducting material. Between the collector and the micro porous layer (on an outer side of the micro porous layer), a gas diffusion layer (GDL) may be provided as desired. It is to be noted that an air supply pump not illustrated may be connected to the cathode electrode 61, or the cathode electrode 61 may configured to communicate with outside through an opening (not illustrated) provided in a connection member (not illustrated) thereby being supplied with air, namely oxygen, by natural ventilation.

The electrolyte film 63 is made of, for example, a proton conducting material having a sulfonate group (—$SO_3H$). As the proton conducting material, there is a polyperfluoroalkyl sulfonic acid-based proton conducting material (for example, "Nafion (registered trademark)" made by E. I. du Pont de Nemours and Company), a hydrocarbon-based proton conducting material such as polyimide sulfonic acid, a fullerene-based proton conducting material, or the like. Here, this electrolyte film 63 is configured using the ion exchange resin (the ion exchange resin containing the moisturizing agent) described in the embodiment and the like.

Each of the anode-side flat member 620 and the cathode-side flat member 610 is made of, for example, an aluminum plate or a stainless-steel plate each having a thickness of about 1 mm. Between the power generation section 60 and the cathode-side flat member 610, a porous film 613 made of polyethylene or the like is provided to retain moisture, for example. Between the power generation section 60 and the anode-side flat member 620, a gas-liquid separation film 623 made of porous fluorocarbon resin and polyester is provided, for example. The anode-side flat member 620 has a through-hole 621 distributing fuel F (liquid fuel) and a groove 622 serving as a gas discharge section. This through-hole 621 extends from a surface facing the anode electrode 62 and reaches a surface opposite thereto, and communicates with a fuel vaporizing chamber 65. Provided on an outer side of the anode-side flat member 620 is a fuel supply hole 64 corresponding to each of the unit cells, and the fuel F (liquid fuel) conveyed from the fuel tank by the supply operation of the fuel pump is injected toward the power generation section 60 side through this fuel supply hole 64. Between this fuel supply hole 64 and the anode-side flat member 620, the fuel vaporizing chamber 65 (a fuel vaporization section) vaporizing the fuel F is provided. Further, the cathode-side flat member 610 has a through-hole 611 extending from a surface facing the cathode electrode 61 and reaching a surface opposite thereto, thereby allowing passage of the air (oxygen) serving an oxidizer.

In the fuel cell 6 having such a configuration, the electrolyte film 63 is configured using the ion exchange resin (the ion exchange resin containing the moisturizing agent) described in the embodiment and the like and thus, it is possible to suppress a decline in ionic conductivity in an environment at a low humidity, a high temperature, or the like. Therefore, characteristic deterioration (for example, a decline in generating capacity) of the fuel cell 6 depending on an ambient environment may be suppressed.

It is to be noted that the present technology may be configured as follows.

(1) A drive unit including:
one or more polymer actuator devices,
wherein the polymer actuator device is configured using an ion exchange resin containing a moisturizing agent.
(2) The drive unit according to (1), wherein
the polymer actuator includes a pair of electrode films and a polymer film inserted between the pair of electrode films, and
the ion exchange resin is used in one or more of the pair of electrode films and the polymer film.
(3) The drive unit according to (2), wherein the ion exchange resin is used in each of the pair of electrode films and the polymer film.
(4) The drive unit according to (3), wherein a content of the moisturizing agent in the polymer film is more than a content of the moisturizing agent in the electrode film.
(5) The drive unit according to (3), wherein the ion exchange resin is selectively used in the polymer film.
(6) The drive unit according to any one of (1) to (5), wherein the moisturizing agent is made of a water molecule adsorbent.
(7) The drive unit according to (6), wherein the water molecule adsorbent is configured using porous fine particles.
(8) The drive unit according to (7), wherein the porous fine particles are configured to include one or more kinds of zeolite, silica, and carbon.
(9) The drive unit according to (8), wherein a content of the zeolite in the ion exchange resin is substantially 0.25 wt % or more and substantially 1.00 wt % or less both inclusive.
(10) The drive unit according to (9), wherein the content of the zeolite in the ion exchange resin is substantially 0.50 wt %
(11) The drive unit according to any one of (7) to (10), wherein in the porous fine particles, pores are filled with water molecules.
(12) The drive unit according to any one of (6) to (11), wherein
$W>(0.0005/A)$ is satisfied,
Where W is a content of the water molecule adsorbent in the ion exchange resin, and A is a water content in the water molecule adsorbent.
(13) The drive unit according to any one of (6) to (12), wherein an ion exchange equivalent weight (an EW value) in the ion exchange resin is substantially 800 [g/eq] or less.
(14) The drive unit according to any one of (6) to (13), wherein the water molecule adsorbent is made of a hydrophilic organic compound.
(15) The drive unit according to any one of (6) to (13), wherein the water molecule adsorbent is made of a deliquescent substance.
(16) The drive unit according to any one of (1) to (15), being configured as a lens drive unit driving a lens.
(17) A lens module including:
a lens; and
a drive unit driving the lens,
wherein the drive unit includes one or more polymer actuator devices, and
the polymer actuator device is configured using an ion exchange resin containing a moisturizing agent.
(18) An image pickup unit including:
a lens;
an image pickup device acquiring an image pickup signal of image formation by the lens; and
a drive unit driving the lens,
wherein the drive unit includes one or more polymer actuator devices, and
the polymer actuator device is configured using an ion exchange resin containing a moisturizing agent.
(19) A fuel cell including:
one or more power generation sections,
wherein the power generation section includes an oxygen electrode, a fuel electrode, and an electrolyte film inserted between the oxygen electrode and the fuel electrode, and
the electrolyte film is configured using an ion exchange resin containing a moisturizing agent.
(20) An ion exchange resin containing a moisturizing agent.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:
1. A drive unit comprising:
at least one polymer actuator device including an ionic conductive polymer compound film,
wherein the ionic conductive polymer compound film includes an ion exchange resin and a moisturizing agent dispersed in the ion exchange resin;
wherein the moisturizing agent includes a water molecule adsorbent;
wherein the water molecule adsorbent includes porous fine particles;
wherein the porous fine particles include zeolite, a content of the zeolite in the ion exchange resin is substantially from 0.25 wt % to substantially 1.00 wt %.
2. The drive unit according to claim 1, wherein
the polymer actuator includes a pair of electrode films and the ionic conductive polymer compound film is inserted between the pair of electrode films, and the ion exchange resin is used in at least one of the pair of electrode films and the ionic conductive polymer compound film.
3. The drive unit according to claim 2, wherein each of the pair of electrode films and the ionic conductive polymer compound film include the ion exchange resin.
4. The drive unit according to claim 3, wherein a content of the moisturizing agent in the ionic conductive polymer compound film is more than a content of the moisturizing agent in the electrode film.

5. The drive unit according to claim 3, wherein the ion exchange resin is selectively used in the ionic conductive polymer compound film.

6. The drive unit according to claim 1, wherein the content of the zeolite in the ion exchange resin is substantially 0.50 wt %.

7. The drive unit according to claim 1, wherein the porous fine particles include pores that are configured to be filled with water molecules.

8. The drive unit according to claim 1, wherein W>(0.0005/A) is satisfied,
where W is a content of the water molecule adsorbent in the ion exchange resin, and A is a water content in the water molecule adsorbent.

9. The drive according to claim 1, wherein an ion exchange equivalent weight (an EW value) in the ion exchange resin is substantially 800 [g/eq] or less.

10. The drive unit according to claim 1, wherein the water molecule adsorbent includes a hydrophilic organic compound.

11. The drive unit according to claim 1, wherein the water molecule adsorbent includes a deliquescent substance.

12. The drive unit according to claim 1, wherein the drive unit includes a lens drive unit.

13. A lens module comprising:
a lens;
and a drive unit configured to drive the lens,
wherein the driver unit includes at least one polymer actuator device including an ionic conductive polymer compound film, and wherein the ionic conductive polymer compound film includes an ion exchange resin and a moisturizing agent dispersed in the ion exchange resin;
wherein the moisturizing agent includes a water molecule adsorbent;
wherein the water molecule adsorbent includes porous fine particles;
wherein the porous fine particles include zeolite, a content of the zeolite in the ion exchange resin is substantially from 0.25 wt % to substantially 1.00 wt %.

14. An image pickup unit comprising:
a lens;
an image pickup device configured to acquire an image pickup signal of image formation by the lens; and
a drive unit configured to drive the lens,
wherein the drive unit includes at least one polymer actuator device including an ionic conductive polymer compound film, and wherein the ionic conductive polymer compound film includes an ion exchange resin and a moisturizing agent dispersed in the ion exchange resin
wherein the moisturizing agent includes a water molecule adsorbent;
wherein the water molecule adsorbent includes porous fine particles;
wherein the porous fine particles include at least one of zeolite and silica; and
wherein a content of the zeolite in the ion exchange resin is substantially from 0.25 wt % to substantially 1.00 wt %.

* * * * *